(12) United States Patent
Zhou et al.

(10) Patent No.: US 9,351,224 B2
(45) Date of Patent: May 24, 2016

(54) SYSTEM AND METHOD FOR ACCESS POINT SELECTION

(71) Applicant: QUALCOMM Incorporated, San Diego, CA (US)

(72) Inventors: Yan Zhou, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 14/186,920

(22) Filed: Feb. 21, 2014

(65) Prior Publication Data

US 2015/0245280 A1    Aug. 27, 2015

(51) Int. Cl.
*H04W 4/00* (2009.01)
*H04W 36/32* (2009.01)
*H04W 36/08* (2009.01)

(52) U.S. Cl.
CPC .............. *H04W 36/32* (2013.01); *H04W 36/08* (2013.01)

(58) Field of Classification Search
USPC ......................................................... 455/434
See application file for complete search history.

(56) References Cited

U.S. PATENT DOCUMENTS

| 8,457,038 | B1 | 6/2013 | Xue et al. | |
| 2007/0140163 | A1* | 6/2007 | Meier | H04W 8/005 370/329 |
| 2007/0160017 | A1 | 7/2007 | Meier et al. | |
| 2009/0103503 | A1* | 4/2009 | Chhabra | H04W 48/20 370/338 |
| 2010/0271263 | A1 | 10/2010 | Moshfeghi | |
| 2012/0155426 | A1* | 6/2012 | Verma | H04W 36/0033 370/331 |
| 2012/0320790 | A1* | 12/2012 | Shaffer | H04W 40/246 370/254 |
| 2013/0060459 | A1 | 3/2013 | Thach et al. | |

FOREIGN PATENT DOCUMENTS

EP    2112858 A1    10/2009

\* cited by examiner

*Primary Examiner* — Joel Ajayi
(74) *Attorney, Agent, or Firm* — Knobbe Martens Olson & Bear LLP

(57) ABSTRACT

A system and method for priority scan an association with a desired access point is disclosed herein. In one aspect, a wireless station may be associated with a first access point and communicating with the first access point via a contention-based communication protocol. The wireless station may detect movement of the wireless station. Based at least in part on the motion of the wireless station or information regarding at least a second access point, the wireless station may initiate a selective scan for at least the second access point. Based on the scan, the wireless station may then identify at least the second access point. The wireless station may then associate with the second access point based on the movement, an association priority, or information autonomously detected or received from the first or second access point.

24 Claims, 12 Drawing Sheets

SYSTEM AND METHOD FOR ACCESS POINT SELECTION

BACKGROUND

1. Field

The present disclosure relates generally to wireless communications and more specifically to systems, methods, and devices for priority scan and association with access points by a moving wireless station.

2. Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Moving personal wireless devices (stations) points are becoming more prevalent. However, current wireless communication systems experience frequent handovers from access point to access point as a wireless station moves. This tends to increase overhead and latency, while decreasing efficiency and lowering effective coverage.

Therefore there is a need in the art to provide a system and method providing more efficient handovers for devices moving between access point service areas.

SUMMARY

One aspect of the present disclosure provides a method of operating a wireless communication device comprising detecting a movement of a wireless station, at the wireless station, the wireless station being associated with a first access point and communicating with the first access point via a contention-based communication protocol. The method further discloses initiating, based at least in part on the detected movement, a selective scan for a second access point and identifying, based on the selective scan, at least the second access point. The method further discloses associating, based at least in part on the detecting and an association priority, with the second access point.

Another aspect of the present disclosure provides a method of operating a wireless communications device, comprising receiving, at the first access point, at least one message, the at least one message indicating at least the identity of at least a second access point and updating a neighbor list to include the at least the identity of at least one neighboring access point. The method further provides transmitting a report, the report indicating information contained in the neighbor list.

Another aspect of the present disclosure provides an apparatus for wireless communication, comprising a receiver configured to receive a report from a first access point and communicating with the first access point via a contention-based communication protocol. The apparatus further comprises a processor configured to detect, at a wireless station, a movement of the wireless station, the wireless station being associated with a first access point and communicating with the first access point via a contention-based communication protocol, initiate, based at least in part on the detected movement, a selective scan for a second access point, and generate, based at least in part on the detecting and an association priority, an association message for association with the second access point. The processor is further configured to identify, based on the scan, at least the second access point and selectively associate, based at least in part on the detecting, with the second access point.

Another aspect of the present disclosure provides an apparatus for wireless communication comprising means for detecting, at a wireless station, the wireless station being associated with a first access point and communicating with the first access point via a contention-based communication protocol, a movement of the wireless station and means for selectively associating, based at least in part on the detecting, with a second access point.

Another aspect of the present disclosure provides an apparatus for wireless communication comprising means for receiving, at the first access point, at least one message, the at least one message indicating at least the identity of at least a second access point and means for updating a neighbor list to include the at least the identity of at least one neighboring access point. The method further provides means for transmitting a report, the report indicating information contained in the neighbor list.

The priority scan and association of the present disclosure refers to a preference at the station (STA) that may value an access point (AP) having a higher link stability over another available AP with lower link stability. As such, a STA detecting its own motion, may receive information regarding available neighbor APs, and based thereon conduct a scan for such APs having the higher link stability. The moving STA may then, based on available APs and their characteristics selectively associate with an AP based on that priority.

DETAILED DESCRIPTION

Figure 1:
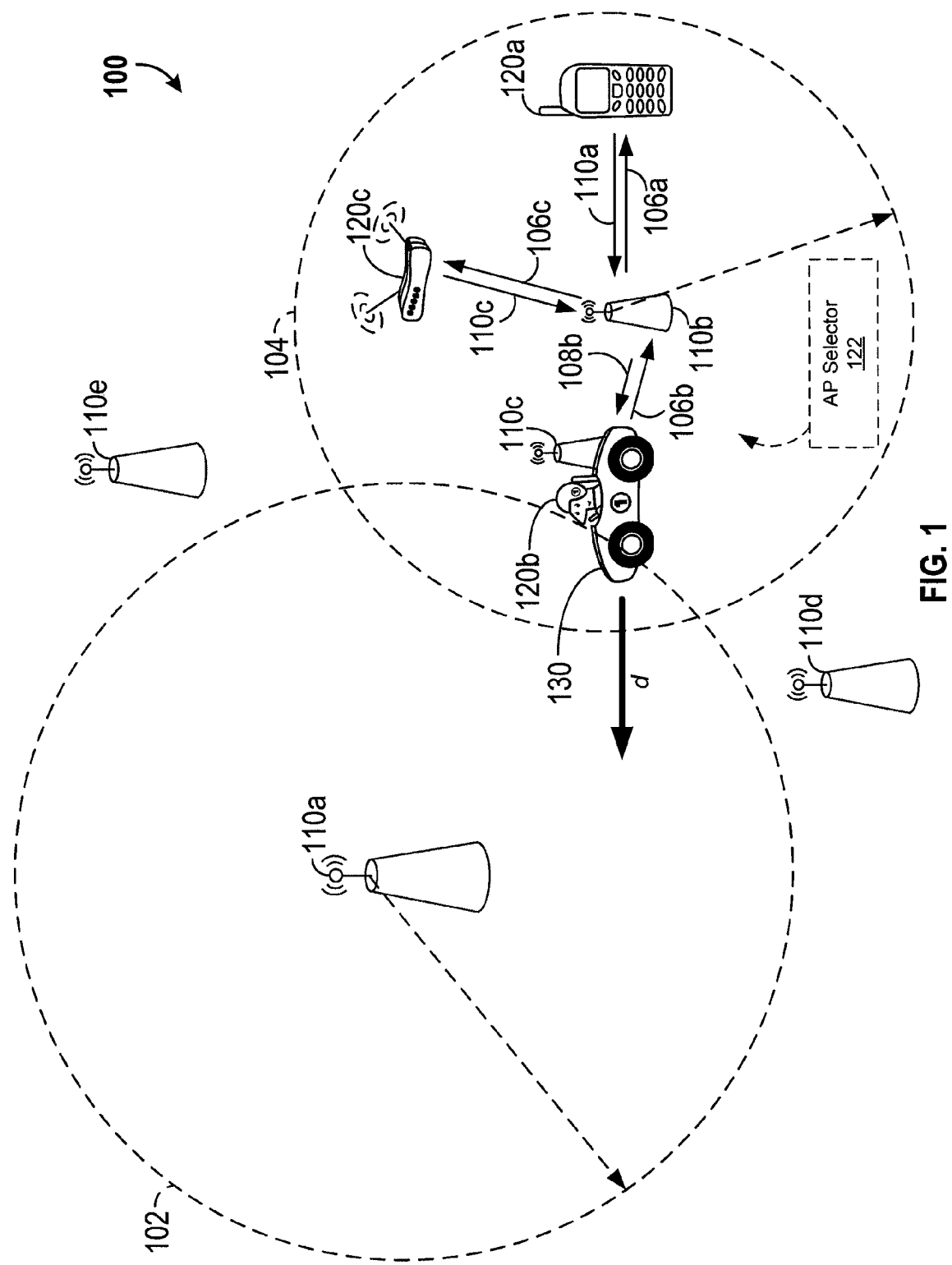
FIG. 1 illustrates an example of a wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim. In addition, the word "exemplary" is used herein to mean "serving as an example, instance, or illustration." Any embodiment described herein as "exemplary" is not necessarily to be construed as preferred or advantageous over other embodiments.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Described herein are systems and methods allowing moving stations (STA) to selectively associate with available access points (AP) based on AP capabilities and link stability. Moving STAs requiring wireless service may experience frequent handover interruptions if served by short range (SR) APs. Network initiated handover switches from a SR AP to a long range (LR) AP may be predicated on handover history, however this may require additional signaling and delay in order to collect handover history and command a STA to handover. Moving STAs may further benefit from association with an AP installed onboard (onboard AP) the vehicle in which the STA is moving.

Thus a fast moving STA may benefit from associations with longer range APs as opposed to shorter range APs due to increased link stability and reduced handover frequency and reduced signaling overhead and delay. STAs moving between land-based APs or STAs moving along with vehicle-mounted APs may further benefit from a prioritized scan and association techniques as disclosed herein.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands. Certain aspects of the present disclosure may be used in conjunction with contention-based communication protocols such as Carrier Sense Multiple Access (CSMA) systems. In a CSMA system, a wireless node (AP or STA) may verify the absence of other traffic on (i.e., contend for) a shared transmission medium (e.g., a frequency band or bus) prior to transmission of its wireless traffic.

In some aspects, wireless signals in a sub-gigahertz band may be transmitted according to the 802.11 ah protocol using orthogonal frequency-division multiplexing (OFDM), direct-sequence spread spectrum (DS SS) communications, a combination of OFDM and DSSS communications, or other schemes. Implementations of the 802.11 ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some aspects, certain of the devices described herein may further implement Multiple Input Multiple Output (MIMO) technology and be implemented as part of the 802.11 ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a wireless communication device, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

Referring initially to FIG. 1, an example topology of multiple neighboring wireless communications systems is shown and generally designated 100. The various wireless communication systems within topology 100 may operate pursuant to a wireless standard, for example an 802.11 standard using certain contention-based communication protocols.

Topology 100 may include a long range (LR) AP 110a and a short range (SR) AP 110b, and an onboard (OB) AP 110c, in addition to neighboring APs 110d, 110e (collectively, APs 110). The terms "long range" and "short range" are terms used in a relative manner. In some embodiments "long" or "short" may be based on a threshold, as will be discussed in more detail below. The terms may also be used in reference to one another, wherein a "long" range may be long as compared to a threshold, but may further be "short" in comparison to another "long" range AP. As a non-limiting example, the relative ranges of LR AP 110a and SR AP 110b are depicted using dashed lines, coinciding with the communications systems 102, 104, respectively. Additionally, for purposes of this disclosure, the term "onboard AP" is intended to describe an AP affixed or otherwise mounted to a vehicle.

Each AP 110 may be incorporated in a separate or individual communications system using one of a variety of communication protocols. In an embodiment, one of the protocols that may be used is Wi-Fi or other contention-based communication protocols. For example, LR AP 110a is associated with communications system 102 and SR AP 110b is associated with communications system 104. Each of the remaining APs 110c-e may be further associated with other communications systems; however for simplicity these are not shown here. Neighboring communications systems 102, 104 may further overlap as shown. It is to be appreciated by those skilled in the art that the number and distribution of neighboring communications systems is not to be considered limiting.

Each communications system 102, 104 may have a plurality of STAs associated with each AP 110. As shown, STAs 120a, 120b, and 120c (collectively STAs 120) may communicate with the AP 110b, however as the wireless devices move through space (shown below) each STA 120 (or AP 110) may modify their associations within various communications systems 102, 104, or topology 100, as required.

A variety of processes and methods may be used for transmissions in the wireless topology 100 between the APs 110 and the STAs 120. For example, signals may be sent and received between the APs 110 and the STAs 120 in accordance with 802.11 protocols and utilized in Wi-Fi or WLAN systems. Signals may be sent and received utilizing other contention-based methods such as CSMA. Use with WLAN or Wi-Fi systems may be advantageous given the relatively short range of many WLAN systems or transmitters when compared with some other wireless protocols. A moving STA may experience reduced signaling, reduced overhead, and lower power consumption when utilizing the methods disclosed herein.

Signals may also be sent using OFDM/OFDMA techniques. If this is the case, the wireless communication systems 102, 104 may be referred to as OFDM/OFDMA systems. Alternatively, signals may be sent and received between the APs 110 and the STAs 120 in accordance with CDMA techniques. If this is the case, the wireless communication systems 102, 104 may be referred to as CDMA systems.

A communication link that facilitates transmission from the AP 110b to one or more of the STAs 120 may be referred to as a downlink (DL) 108, and a communication link that facilitates transmission from one or more of the STAs 120 to the AP 110b may be referred to as an uplink (UL) 106. Alternatively, a downlink 108 may be referred to as a forward link or a forward channel, and an uplink 106 may be referred to as a reverse link or a reverse channel.

The AP 110b may act as a base station and provide wireless communication coverage within communication system 104 and may alternatively be referred to as a basic service area (BSA) 104. The AP 110b along with the STAs 120 associated with the AP 110b and that use the AP 110b for communication may be referred to as a basic service set (BSS). Various BSSs may be further grouped or linked into an extended service set (ESS). An ESS may be created by linking a group of BSSs together with a backbone network so that coverage provided by each BSS overlaps with other BSSs. All of the APs in the ESS may be given the same service set identifier (SSID) or network name. It should be noted that the wireless communication system 104 may not have a central AP 110b, but rather may function as a peer-to-peer network between the STAs 120. Accordingly, the functions of the AP 110b described herein may alternatively be performed by one or more of the STAs 120.

FIG. 1 further depicts OB AP 110c, that may be a vehicle-mounted wireless access point, capable of providing onboard wireless service to a STA 120b in proximity. STA 120b may be onboard the vehicle as shown (e.g., a Wi-Fi enabled cellular phone or smartphone in the driver's possession). While the specific range for the AP 120b is not depicted, it is assumed that AP 110c is capable of providing service to STA 120b, given the proximity of the two devices. Furthermore, the STA 120b may also fall within range of the other communication systems of BSA 102 and BSA 104. Thus, there are various wireless connection options available to STA 120b, onboard a vehicle 130, as it moves in direction d.

Ignoring OB AP 110c for a moment while taking into account the relative motion of STA 120b, in order to maintain service, STA 120b may be required to handover from one AP to another AP as STA 120b moves. As STA 120b approaches the outer range of AP 110b (moving in direction d), STA 120b may be required to handover to AP 110a to maintain wireless service. In general, a STA 120b moving between LR APs will experience less frequent handovers than a STA 120b moving between SR APs (depending on the speed of STA 120b). Conversely, if in an environment having only SR APs, handovers may occur more frequently than in an environment having more LR APs. Handovers may be facilitated where adjacent service areas have coverage overlap, such as the overlap shown between AP 110a and AP 110b (denoted by the overlap between BSA 102 and BSA 104). In general, considering only APs with similar coverage areas (e.g., all SR APs or all LR APs), the frequency of the handovers between those APs (e.g., SR APs) may be proportional to the speed of STA 120b.

In an embodiment such as that of FIG. 1, provided the quality of service (QoS), signal strength, or other pertinent wireless service characteristics are equal between neighboring APs AP 110a and AP 110b, a moving STA 120b may prefer the LR AP 110a to the SR AP 110b, for the increased service and range. In such an embodiment, a STA 120b may prefer to associate with a LR AP 110a over an SR AP 110b due to less frequent handovers.

Considering OB AP 110c once again, moving STA 120b may prefer OB AP 110c over the other available APs 110a, 110b because fewer (if any) handovers will be required, as STA 120b moves with the OB AP 110c, providing, for instance, a steady or more stable wireless service from PB AP 110c than the land-based APs 110a, 110b.

In an embodiment, the STA 120b may selectively associate with one of a variety of APs 110 predicated on a priority or preference list. Such a selective association may be implemented utilizing an AP selector 122 enabling a priority scan and association between an AP 110 and STA 120. AP selector 122 is shown in dashed lines indicating is presence within the architecture of the wireless communications systems and methods. AP selector 122 may comprise a system or group of subsystems enabling the priority selection or preferential selection of an AP 110, as disclosed herein. As a non-limiting example, such a priority scan, or preference list may prefer LR AP 110a over SR AP 110b, and prefer OB AP 110c over LR AP 110a due to the relative link stability. As such, a moving STA 120b may eliminate, limit, or at least reduce the number of handovers required as the STA 120b moves by selectively associating with an AP that provides increased range and stability over other available options. In some embodiments, additional link characteristics such as coverage, or range, data throughput may also be considered in the selective association.

As discussed in more detail below, the STAs 106 and APs 110 may incorporate the characteristics and capabilities of the various embodiments discussed below.

Figure 2:
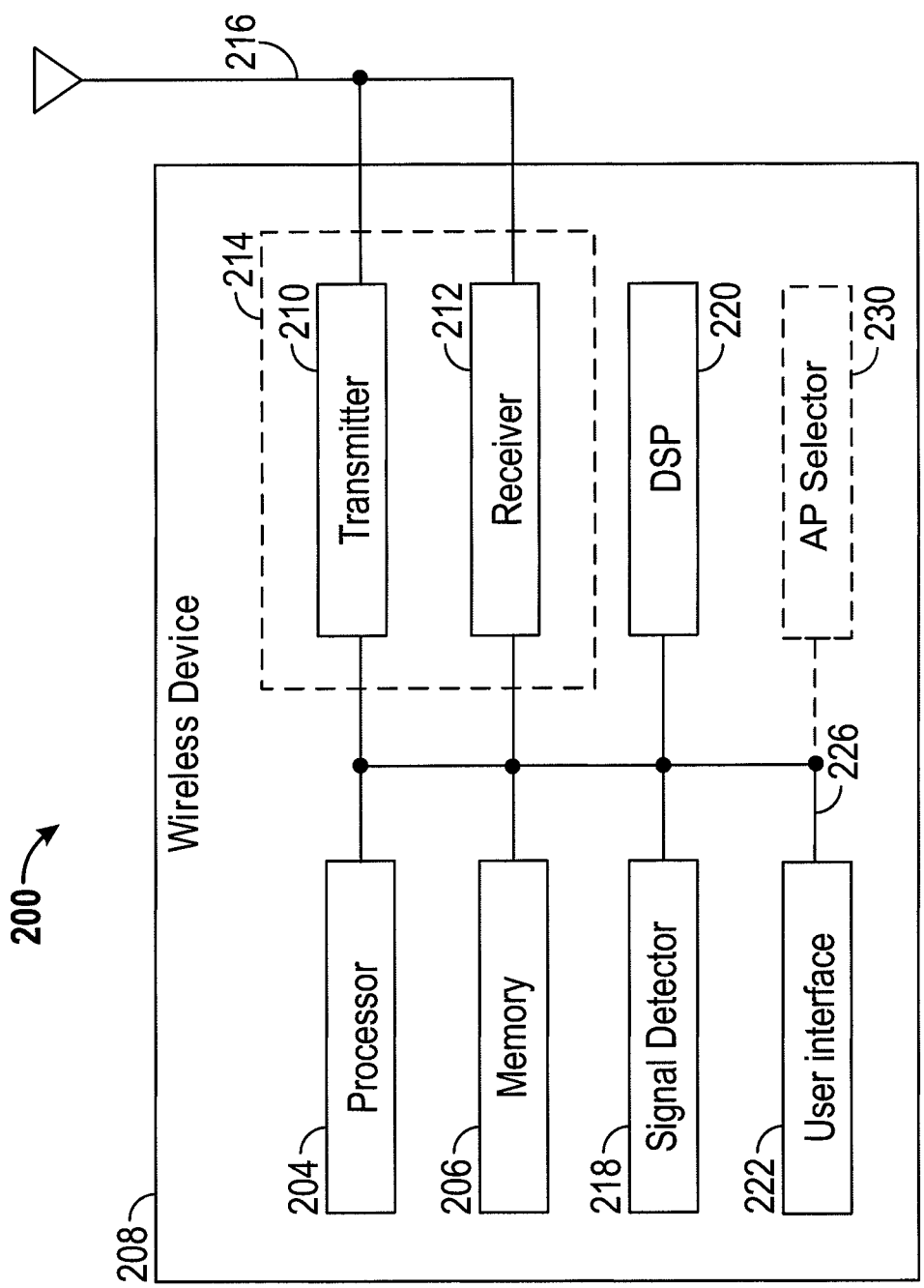
FIG. 2 shows a functional block diagram of a wireless device that may be implemented within the communications system of FIG. 1.

Referring now to FIG. 2, a functional diagram of a wireless device that may be implemented as a STA 120 or AP 110 is shown and generally designated 200. Various components that may be utilized within a wireless device 200 are depicted and described below. The wireless device 200 is an example of a device that may be configured to implement the various methods described herein. For example, the wireless device 200 may comprise the AP 110 or one of the STAs 120 of FIG. 1.

The wireless device 200 may include a processor 204 which controls operation of the wireless device 200. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein. The memory may also store information related to the selective association such as a list of available access points and pertinent operating characteristics. If employed as an AP, device 200 may store information regarding neighboring access points in a neighbor list (NL). The NL may be augmented where the AP receives information from other APs or from an associated STA. As an AP, device 200 may further report information contained in the neighbor list to other STAs. If employed as a STA, device 200 may store priority information related to SR, LR, and OB APs or information received from an AP (according the NL) and utilize such information in priority scan and association with preferred APs.

When the wireless device 200 is implemented or used as a transmitting node, the processor 204 may be configured to select one of a plurality of medium access control (MAC) header types, and to generate a packet having that MAC header type. For example, the processor 204 may be configured to generate a packet comprising a MAC header and a payload and to determine what type of MAC header to use, as discussed in further detail below.

When the wireless device 200 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 200 may also include a housing 208 that may include a transmitter 210 and a receiver 212 to allow transmission and reception of data between the wireless device 200 and a remote location. The transmitter 210 and receiver 212 may be combined into a transceiver 214. An antenna 216 may be attached to the housing 208 and electrically coupled to the transceiver 214. The wireless device 200 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header types. In some aspects, the receiver 212 is configured to detect a type of a MAC header used and process the packet accordingly, as discussed in further detail below.

The wireless device 200 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 200 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 200 may further comprise a user interface 222 in some aspects. The user interface 222 may comprise a keypad, a microphone, a speaker, and/or a display. The user interface 222 may include any element or component that conveys information to a user of the wireless device 200 and/or receives input from the user.

The wireless device 200, where implemented as a STA 120 may further have a module or process designated as an AP selector 230 (shown in dashed lines), implementing one or more of the processes disclosed herein whereby the STA 120 in able to select the most suitable or preferable AP 110 based on AP capabilities, services, range, or overall link stability. In an embodiment, device 200 may further be implemented as an AP 110, as noted above. As such, AP selector 230 may not be required, as indicated by the dashed lines.

The various components of the wireless device 200 may be coupled together by a bus system 226. The bus system 226 may include a data bus, for example, as well as a power bus, a control signal bus, and a status signal bus in addition to the data bus. Those of skill in the art will appreciate the components of the wireless device 200 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

For ease of reference, when the wireless device 200 is configured as a transmitting node, it is hereinafter referred to as a wireless device 200t. Similarly, when the wireless device 200 is configured as a receiving node, it is hereinafter referred to as a wireless device 200r. A device in the wireless communication system 102, 104 may implement only functionality of a transmitting node, only functionality of a receiving node, or functionality of both a transmitting node and a receive node.

As discussed above, the wireless device 200 may comprise an AP 110 or a STA 120, and may be used to transmit and/or receive communications having a plurality of MAC header types.

Figure 3:
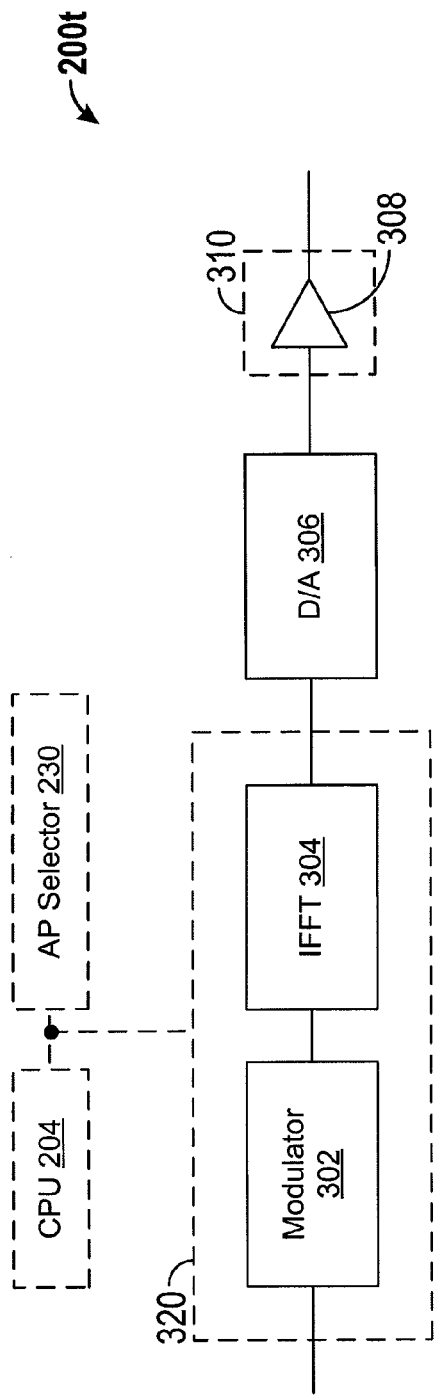
FIG. 3 shows a functional block diagram of exemplary components of the wireless device of FIG. 2.

FIG. 3 illustrates various components that may be utilized in the wireless device 200t to transmit wireless communications. The components illustrated in FIG. 3 may be used, for example, to transmit OFDM communications. As discussed above, the wireless device 200 may comprise an AP 110 or a STA 120, and may be used to transmit and/or receive communications. In some aspects, the components illustrated in FIG. 3 are used to generate and transmit packets to be sent over a bandwidth of less than or equal to 1 MHz.

The wireless device 200t of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 200t may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 200t (e.g., see description above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols.

The wireless device 200 may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 200 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below.

Figure 4:
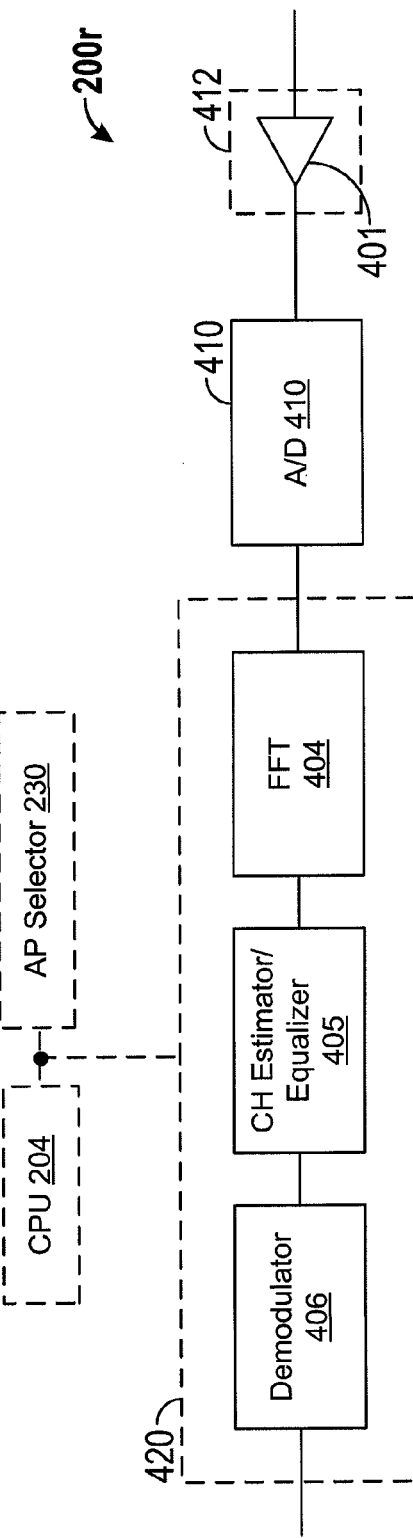
FIG. 4 shows a functional block diagram of exemplary components of the wireless device of FIG. 2.

For both the foregoing discussion of FIG. 3 and the following discussion with respect to FIG. 4, each wireless device 200$t$, 200$r$ may be implemented as a STA 120 or an AP 110. As such, certain embodiments may further include the AP selector 230 as discussed above. AP selector 230 is shown in dashed lines in both FIGS. 3 and 4, indicating that in some embodiments AP selector 230 may not be a necessary aspect and thus is optional based on the implementation.

FIG. 4 illustrates various components that may be utilized in the wireless device 202 of FIG. 2 to receive wireless communications. The components illustrated in FIG. 4 may be used, for example, to receive OFDM communications. In some aspects, the components illustrated in FIG. 4 are used to receive data units over a bandwidth of equal to or less than 1 MHz. For example, the components illustrated in FIG. 4 may be used to receive data units transmitted by the components discussed above with respect to FIG. 3.

The receiver 412 of wireless device 200$r$ is configured to receive one or more packets or data units in a wireless signal. Data units that may be received and decoded or otherwise processed as discussed below.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 200$r$ may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 200$r$. In some aspects, the analog to digital converter 410 is implemented in the transceiver 214 (FIG. 2) or in a data receive processor.

The wireless device 200$r$ may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses.

The wireless device 200$r$ may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 200$t$ may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Medium Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 200$t$ shown in FIG. 3 shows an example of a single transmit chain to be transmitted over an antenna. The wireless device 200$r$, shown in FIG. 4, depicts an example of a single receive chain to be received over an antenna. In some implementations, the wireless device 200$t$ or 200$r$ may implement a portion of a MIMO system using multiple antennas to simultaneously transmit data.

Figure 5:
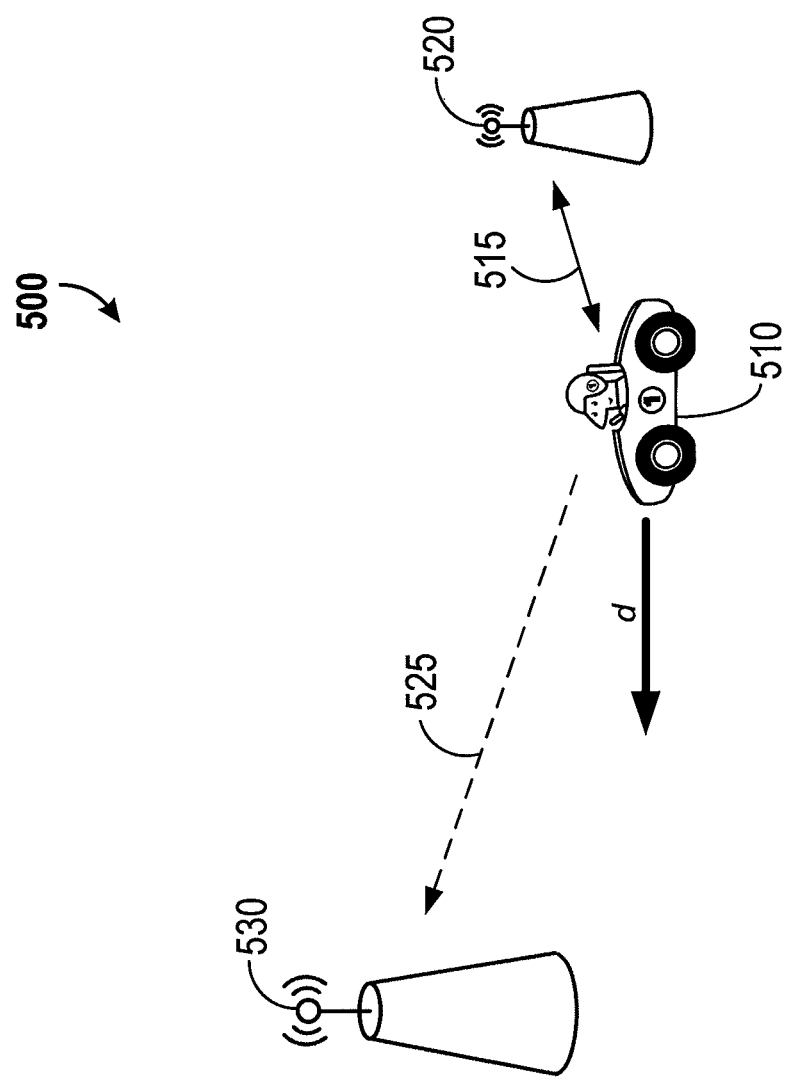
FIG. 5 illustrates an exemplary wireless communication topology according to the present disclosure.

Referring now to FIG. 5, an embodiment of a communications system 500 is depicted. Communications system 500 shows a STA 510 moving away (to the left, in direction d) from an established connection 515 with a SR AP 520. As noted above, "short" range versus "long" range may be defined according to a threshold. The ranges may also be referred to a LR AP or a SR AP based on their relative service coverage. As a non-limiting example, a given STA 510 may classify a short range AP as a range less than 20-30 meters. Such a threshold may be set by a standard or specific standards body or by individual APs, based on a given threshold. In an embodiment, "range" may further be described as coverage area or radius. In an embodiment, the threshold may allow individual APs 510, 520 to further classify themselves and a LR AP or SR AP, further informing other STAs of that classification via a beacon channel or other reports and messaging. In an embodiment, APs 520, 530 may alternatively associate the information regarding ranges or coverage capabilities with a neighbor list and broadcast such information within a beacon or similar message, as discussed below. A neighbor list may be a list of neighboring access points maintained at each AP 520 or AP 530, and augmented by information received from neighboring APs or from STAs such as STA 510. In an embodiment, the neighbor list may be provided to other APs or to STAs within a BSA facilitating selective association with a preferred or desired AP. It is to be appreciated by those skilled in the art that the measurements provided herein are for illustrative purposes and should not be considered limiting, as any practical threshold may be set.

In an embodiment, a given moving STA 510 may independently determine how to classify the range of an AP or conduct such a determination on a relative basis, predicated on the various APs currently available within a given environment. In an embodiment, a STA 510 may maintain a database of known APs or be preprogrammed with a list of APs that provide a desired service, thus based on the measured service capabilities of a selected AP, the STA 510 may be able to independently classify a given AP as SR or LR in comparison to previously experienced APs. As a non-limiting example, AP 510 may encounter a "short range" AP 520 with a 20 meter range (radius). Such a measurement may be said to be "short range" when compared with an AP 530 having an exemplary 1000 meter range. Furthermore, a STA 510 may classify an SR AP 520 with a 1000 meter range as "short range" when compared to an LR AP 530 with a 20,000 meter range. As such in some embodiments, the classification of a SR AP or LR AP is not absolute with respect to a threshold and may be dynamically adjusted based on a STA's 510 environment.

The detection of movement, and additionally the detection of speed or velocity, may allow a moving STA 510 the ability to prompt or initiate an appropriate scan for wireless service or prioritized scan as discussed below, in order to minimize unnecessary signaling or communication and reduce the number of required handovers between STAs. This may, in turn, increase efficiency and reduce power consumption.

In an embodiment, the STA 510 may detect its own movement, which in association with the classification or capabilities of its current AP (e.g., a SR AP 520) and adjacent APs, may trigger or compel a scan for other available or more suitable APs 530. Some of the characteristics a STA 510 may utilize to trigger a scan may be when a station 510 speed is higher than a speed threshold set at the STA 510, a handover rate is greater than a handover threshold, a AP 520 or AP 530 beacon observation time (e.g., the time between a first time receiving a beacon to a last time receiving a beacon, is less than a threshold for a detected access point), a measurement of the Doppler shift of the detected access point signal is greater than a threshold, and a measured access point signal temporal correlation is less than a threshold time spacing. In an embodiment, these characteristics as measured at the STA 510 may be used to determine if, or how fast the STA 510 is moving, thus determine if a scan for other APs with more stable services is required.

Returning to FIG. 5, a moving STA 510 may have an established association 515 with SR AP 520, and further be informed that SR AP 520 is a "short range" AP, whether by notification from the SR AP 520 via a beacon or broadcast message, or by independent determination. Accordingly, the moving STA 510 may also be informed that within a certain amount of time, the signal from SR AP 520 will fade, reducing the quality of the signal and the service provided. This in association with the movement of STA 510 may trigger the moving STA 510 to initiate a scan 525 for other APs, such as a LR AP 530. Advantageously, a LR AP 530 may be able to provide the moving STA 510 with suitable service quality for a longer duration than the SR AP 520, due to the speed of, and distance covered by, the STA 510. A STA 510 may further prefer, and selectively associate with the longer range APs (AP 530) thereby reducing the handover rate and potentially saving power due to the reduced signaling.

The scan conducted by moving STA 510 may be a scan triggered by information received from AP 520 in the form of a neighbor list including information about neighboring APs such as coverage, range, and capabilities, in addition to a LR or SR classification as discussed. In an embodiment, the STA 510 may then scan for a specific AP known to be a LR AP, e.g., the STA 510 may scan specifically for LR AP 530. The moving STA 510 may conduct a scan or a "prioritized scan" based on the range or coverage desired by the moving STA 510. The "priorities" used to conduct the scan may be defined based on link stability, the desirable ranges, or other characteristics as defined by the moving STA 510.

As a non-limiting example, moving STA 510 may receive neighbor list information from AP 520 regarding the coverage range, average radius, LR classification, or other pertinent characteristics of AP 530 and other neighboring APs (not shown). Since moving STA 510 may also have information regarding AP 520 that, e.g., SR AP 520 is an SR AP, moving STA 510 is triggered to conduct the scan. In the event the neighbor list information provided moving STA 510 includes an indication that AP 530 is an LR AP or has a more desirable range or coverage, then the moving STA 510 may conduct a scan 525 particularly seeking services from the identified AP 530. In an embodiment, the AP 520 may not have such information to provide to moving STA 510, in which case moving STA 510 may have to do a "blind" full scan, scanning for all available APs in the vicinity without any a priori knowledge of currently available APs. In an embodiment, STA 510 may also conduct priority scan based on pre-programmed information, stored memory, or information it was previously provided from a previously associated AP.

AP 520 and AP 530 may further augment their individual neighbor lists with information provided by moving STA 510, by transmissions between the APs or as new moving APs (e.g., an OB AP) or a new stationary APs (e.g., SR AP, LR AP) are introduced into the service area.

In an embodiment, an AP 520 or AP 530 may broadcast information to assist moving STA 510 to identify available APs (520/530) as SR or LR APs. An AP may broadcast its own coverage area or radius and Classification as a LR AP or SR AP. The APs may indicate such characteristics in the form of a minimum, maximum, or average radius. Broadcast coverage information may further be quantized, e.g., a radius greater than/less than 10, 30, 50, 100, 1000 meters. The AP 520, 530 can further estimate such measurements based on a location report from associated STAs 510 or other moving STAs 510 handed over between APs, e.g., AP 520 to AP 530.

This information may further be provided to the moving STA 510, improving the STA 510 scans for new services.

In an embodiment, where the SR AP 520 or LR AP 530 present an independent determination of its classification as a SR AP or LR AP, the AP may also broadcast a maximum supported STA 510 speed as a function of coverage diameter divided minimum required connection time, e.g., 10 meters per second (m/s). This may allow each AP 520, 530 to quantify the maximum supported speed for a given moving STA 510.

The moving STA 510 may further determine a LR AP versus a SR AP based on coverage information combined with the speed of STA 510. As a non-limiting example, such a determination may be made independently by the moving STA 510 where a dwelling time, defined as the amount of time the STA is associated with a given AP, is greater than a threshold or a minimum required AP connection time. The moving STA 510 may estimate the STA dwelling time as a measurement of AP coverage divided by the STA speed, for instance.

In an embodiment, a classification of SR AP or LR AP may further be a function of both the AP 520 maximum supported STA speed and the STA 510 speed at the time. For example, in the event an AP 520 self-designates itself as a LR AP based on its own maximum support speed, if the STA 510 is a fast-moving STA, then the STA may independently classify AP 520 as a SR AP due to the time/distance and connection time available to the moving STA 510.

In an embodiment, the AP 520, 530 may determine its own classification as a LR AP or SR AP based on its own information, e.g., if the AP coverage radius (m), the maximum supported speed (m/s), or maximum transmit power (dBm) are greater than a given threshold. Such a threshold may be defined by a standard, such as the 802.11 ah standard, or independently determined by individual access points or wireless stations.

The qualities and capabilities of the various embodiments of STA 510 and APs 520, 530 depicted with respect to FIG. 5 may also be implemented within STAs 120 and/or APs 110 of FIG. 1.

Figure 6:
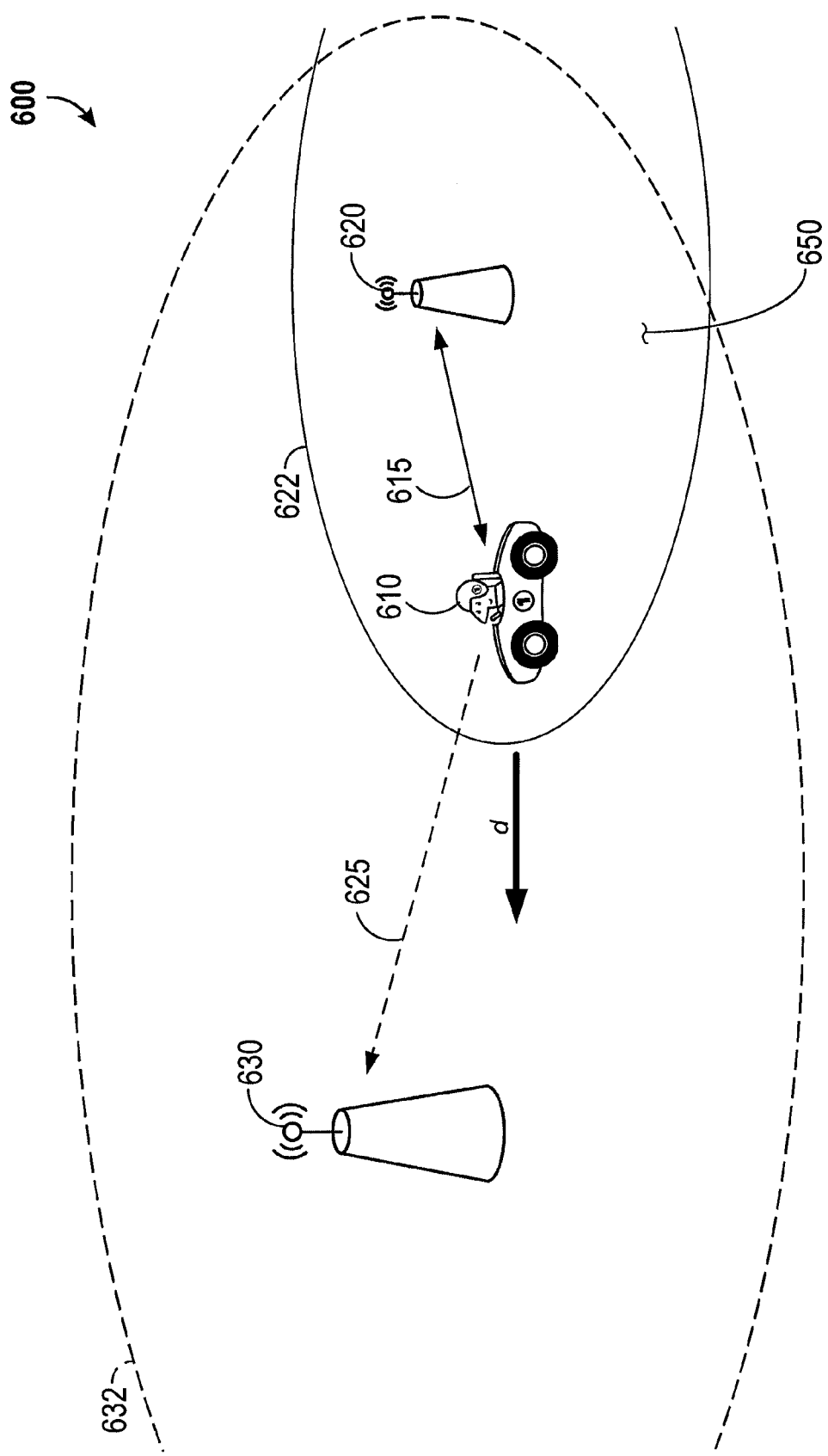
FIG. 6 illustrates an exemplary wireless communication topology according to the present disclosure.

Referring now to FIG. 6, an embodiment of communication system 600 is shown, with a moving STA 610, traveling in direction d from AP 620 to AP 630. Communication system 600 is similar to communication system 500, indicating an overlap in the coverage of each AP 620 and AP 630. The range 622 of AP 620 and range 632 (shown in dashed lines) of AP 630 provide an illustration of the relative diameters and example of possible overlap in coverage. For purposes of the present disclosure, overlapped LR APs may be those APs such as AP 630 (having a "LR" classification) overlapped with an AP 620 (having a SR classification). As noted herein, the LR or SR classification may be accomplished independently by the STA 610 or indicated by the AP 620 and AP 630. While the STA 610 (similar to STA 510) may receive position and broadcast information from nearby APs, so too, for example, may AP 620 receive information from AP 630. AP 620 may receive the broadcast information regarding the capabilities of AP 630 directly, via STA 610, or from a network database. As such, the SR AP 620 may identify overlapping LR APs 630 from a STA 610 report or via a scan by SR AP 620.

In an embodiment, SR AP 620 may use this information and broadcast the channel number and identification of all overlapped LR APs 630, indicating to the STA 610 the availability of other APs. As a result, a moving STA 610 with a connection 615 to SR AP 620 may utilize received information to conduct a scan for other APs 630 indicated as being overlapped with AP 620. STA 610 may conduct this scan independently of considering the signal strength of the operating AP 620. As a point of comparison, an overlapped LR AP 630 may be identified to STA 610 by AP 620, after which the moving STA 610 may scan for the identified AP 630. Alternatively, a moving STA 610 may utilize the information provided in a neighbor list from AP 620 to scan for other alternative APs when the signal strength is poor or falls below a threshold.

The availability of such information to a moving STA 610 may allow the STA 610 to associate with a LR AP 630 that may provide service for a longer period of time than the SR AP 620. As shown in FIG. 6, the range 632 of LR AP 630 nearly encompasses the range 622 or SR AP 620. Thus, moving STA 610 may associate with LR AP 630 even if it is immediately adjacent to the SR AP 620. This flexibility may allow STA 610 wireless service over a greater range, in addition to reduced handovers. This may service to increase efficiency and reduce power consumption due to decreased signaling requirements.

In an embodiment, a SR AP 620 may broadcast LR AP 630 information to assist moving STA 610 to select a LR AP. This may further be done in terms of percentage of overlapped coverage per overlapped LR AP.

As shown, the overlap 650, indicating the amount of coverage area of AP 620 overlapped by AP 630 may be estimated as a percentage of locations where the signal strength can be measured at a level greater than a predefined threshold, e.g., 80 dBm. SR AP 620 may estimate the percentage of coverage overlap by requesting that STAs 610 within AP's 620 coverage area to report the received signal strength of LR AP 630 at various different locations. As such an AP 620 can determine a mapping of the coverage of a neighboring AP 630 and include such information in its neighbor list.

In an embodiment, a fast moving STA 610 may initiate a direct association with a LR AP 630 under certain conditions. A "direct association" is a selective association conducted without scanning for a desired AP. In an embodiment the direct association process may be initiated, for example, if the percentage of overlap of SR AP 620 is greater than a threshold. As a non-limiting example, a moving STA 610 may conduct a direct association with a desired AP if the overlap is greater than 95%. However, the moving STA 610 may also adjust that threshold to another practical limit or different level, e.g. 75%, as required based on the overall coverage area and velocity of STA 610, in addition to other pertinent parameters affecting connection and wireless service. Such a direct association capability may alleviate the need for STA 610 to scan for known (or unknown) APs. It is to be appreciated by those skilled in the art that the percentages are not to be considered limiting, as any practical threshold may be implemented based on the coverage of individual APs. Such a direct association may further be executed in other circumstances when an AP 510 discovers a desired AP, such as an OB AP, discussed below.

The prioritized scan based on known APs, and the elimination of a scan in place of a direct association as discussed, may lead to ancillary benefits, including power savings and increased efficiency. A moving STA 610 may save power through elimination of an AP scan for SR APs and only scanning channel dedicated for LR APs, where those specific channels exist. STA 610 may further power off radios specifically dedicated to SR APs if so delineated.

In an embodiment, a STA 610 may be equipped with multiple transceivers having different frequency bands or channels. Certain bands may service only SR APs 620, e.g., 2.4 GHz and 5.0 GHz may be assigned to only SR APs, while a 900 MHz channel may be assigned to both SR and LR APs. A STA 610 may be informed of such a characteristic through a preprogrammed setting from the factory or through information gained through a network server or similar. Accordingly, after a STA 610 makes a switch to a LR channel, the STA 610 may power down the transceiver(s) associated with SR APs in order to save power.

The qualities and capabilities of the various embodiments of STA 610 and APs 620, 630 depicted with respect to FIG. 6 may also be implemented within STAs 120 and/or APs 110 of FIG. 1.

Figure 7:
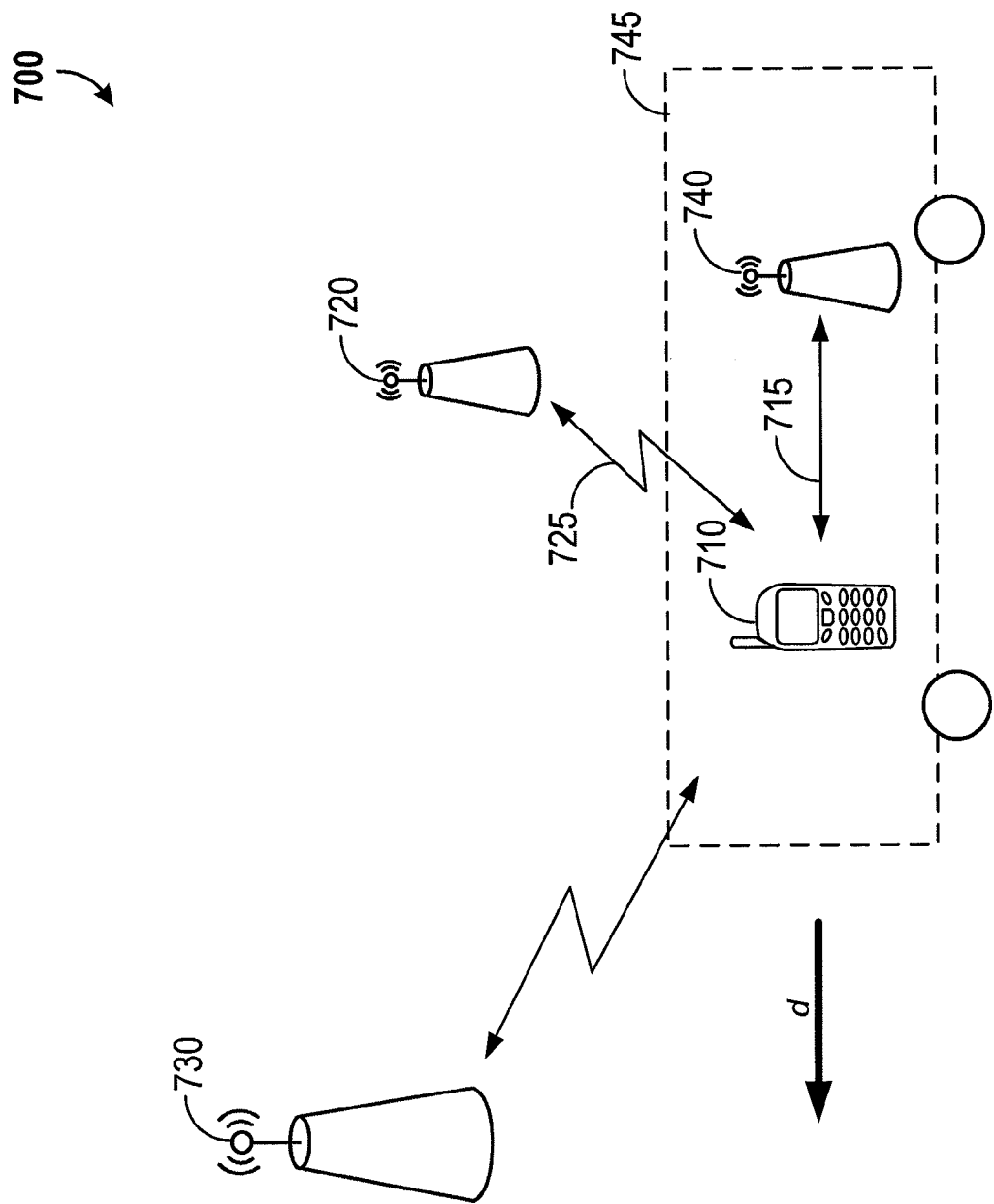
FIG. 7 illustrates an exemplary wireless communication topology according to the present disclosure.

Referring now to FIG. 7, communications system 700 is shown, illustrated with STA 710 within range of SR AP 720, LR AP 730, and OB AP 740. Increasingly, trains, buses, and even some personal vehicles are equipped with mobile access points, such as OB AP 740, allowing the occupants of vehicle 745 to receive stable wireless service while moving. In an embodiment, a STA 710 may not only be in the presence of a SR AP 720 and a LR AP 730, but may also be in a vehicle with a vehicle-mounted OB AP 740. In an embodiment, the STA 710 may then be enabled to scan and selectively associate with the SR AP 720 and LR AP 730, but also with the OB AP 740. This may be accomplished by incorporating a priority scan and/or an association priority.

In an embodiment, such a priority scan may involve the use of a neighbor list with information regarding available APs and their characteristics. This may alleviate the STA 710 from having to conduct a blind full scan for wireless services from available APs, thus reducing power consumption. A moving STA 710 (moving because it is onboard a vehicle 745) may prefer the OB AP 740 over LR AP 730, and LR AP 730 over SR AP 720 due to relative link stability. These association priorities may be set, based on the received signal strength, ranges, coverage, bandwidth, throughput, or other pertinent capabilities or characteristics of the various available AP's related to link stability. Notionally, an OB AP 740 may be capable of providing STA 710 with the most reliable (i.e., most stable) connection given the relative motion: OB AP 740 and STA 710 are moving together, thus STA 710 is not required to handover to another AP. Accordingly, the OB AP 740 may have the highest priority, followed by the LR AP 730, and SR AP 720, respectively. Even if a LR AP 730 is available, if the vehicle 745 is moving fast, then the STA 710 may still have to handover to another AP periodically in the absence of the OB AP 740.

The priority scan and association may be established in terms of AP-to-STA link stability. In an embodiment, link stability may be a function or range, throughput, data rate, proximity, or other characteristics determined to be important by a given STA. Link stability may also be described in terms of how often a STA 710 is required to handover. In FIG. 7, the OB AP 740 may provide the most stable link quality due to the minimal and/or substantially constant distance between STA 710 and OB AP 740, while the STA 710 is onboard the vehicle 745. It follows, then that LR AP 730 has less link stability due to shadowing as a result of relative motion or path loss variation based on the location and velocity of the STA 710 as vehicle 745 moves. In general then, SR AP 720 has the least stable link quality under such conditions and will likely experience the most frequent handovers due to the relatively small coverage when compared to LR AP 730 and OB AP 740. Such evaluations of "link stability" are not absolute and may be adjusted based on conditions.

In an embodiment, the priority scan and association allows a fast moving STA 710 to reduce the number of scanned APs by prioritizing AP types based on link stability and associating with the AP with the highest priority or stability. Association with an AP providing increased link stability may further allow the STA 710 to reduce scan frequency and the corresponding time and power consumption.

In an embodiment, higher priority APs may be referred to as "higher order" APs. In an embodiment, a fast moving STA 710 may scan higher order APs (OB AP 740 or LR AP 730) before lower order APs or in some cases stop scanning for lower order APs if the higher order APs are available. In such a context, "available" may not only refer to whether a given AP is in range or available to provide service, but also that the given AP satisfies certain connection conditions, such a minimum received signal strength, available backhaul speed, coverage, or other pertinent characteristics.

In an embodiment, STA 710 may enter or leave an area in which it receives wireless services from an OB AP 740. Such a circumstance may be illustrated where a STA 710 embarks or disembarks the vehicle 745. The use of the neighbor list may assist the priority scan and association by a STA 710 in such a circumstance. Consider for example, where STA 710 is associated with SR AP 720 via link 725 and subsequently, vehicle 745, equipped with OB AP 740, approaches within range of SR AP 720. In the absence of the processes disclosed herein, the STA 710 may only discover the OB AP 740 with a blind full scan to discover any available APs and available services in the area. However, as disclosed, SR AP 720 and LR AP 730 may receive information from OB AP 740 (e.g., from a OB AP 740 beaconing channel), dynamically updating their respective neighbor lists to include information about any neighboring APs, including the OB AP 740 as it enters the coverage area, or to remove information regarding OB APs 740 leaving the coverage area as required. To reduce transient effects of multiple updates (e.g., add and remove functions) to a neighbor list, a given AP may have a temporal restriction on the updates, such that information is updated after a certain period of time passes (e.g., after OB AP 740 enters or leave a coverage area).

In an embodiment, the OB AP 740 may transmit a dedicated beacon including an OB AP 740 indicator, identification, and operating channel, that SR AP 720 and LR AP 730 may include in their respective neighbor lists, having that information available for transmission to other wireless devices, e.g., STA 710. For example, the indicator may comprise an indication that the OB AP 740 is an onboard access point, in addition to containing the OB AP 740 BSSID (Basic Service Set Identification) or MAC (Media Access Control) address. Alternatively or additionally, such an indicator may include a data packet (e.g., a binary bit) indicating it is an OB AP. Further, the type of vehicle (e.g., train, bus, car, aircraft) may be included, as well as an identification of such a vehicle (e.g., flight number, train identification, bus number). A STA 710 in the presence of multiple OB APs 740 may utilize such information to select among the available services according to, for example, the association priority. The land-based APs (e.g., SR AP 720, LR AP 730) may further indicate a high probability of the presence of an OB AP 740 based on historical information, possibly prompting the STA 710 to conduct a scan for OB AP services.

In an embodiment, STA 710, then associated with AP 720, may receive information regarding OB AP 740 via link 725. Prior to embarking vehicle 745, STA 710 may then conduct a scan specifically for OB AP 740 ensuring OB AP 740 is within range, and subsequently associate with OB AP 740 as STA 710 begins moving along with vehicle 745 after boarding vehicle 745. Therefore, by dynamically adding information regarding the characteristics of OB AP 740 within range of SR AP 720 and LR AP 730 to their respective neighbor lists, a moving STA 710 associated with SR AP 720 or LR AP 730 can quickly detect and switch to an association with OB AP 740 within range, as indicated in the neighbor lists of the land-based APs (e.g., SR AP 720 or LR AP 730).

In another embodiment, where STA 710 is onboard vehicle 745 and associated with OB AP 740 via link 715, as vehicle 745, enters a coverage area containing SR AP 720 and LR AP 730, OB AP 740 may further dynamically update its neighbor list to include a SR/LR AP indicator, identification, and operating channel for each of the various land-based APs (e.g., SR AP 720 and LR AP 730) in range of the OB AP 740. Similar to above, such an indicator may comprise an indication that a given AP is an SR AP (e.g., SR AP 720) or a LR AP (e.g., LR AP 730). The identification may further comprise a BSSID or MAC address for the particular AP, similar to that noted above. OB AP 740 can obtain the above information regarding the land-based APs by directly reading their associated beacons or via neighbor list information provided by other APs within range, or via a network server and/or an indication of location (e.g., a GPS location). This information may further be provided by OB AP 740 to the STA 710, so that STA 710 can quickly conduct a priority scan for the AP or APs identified and subsequently detect and switch to a land-based AP within range as indicated in the neighbor list of OB AP 740 without the need to conduct a blind full scan for services. This may be required if STA 710 leaves the service area of OB AP 740, e.g. disembarks the vehicle 745. OB AP 740 may further update its own neighbor list when entering or leaving a land-based AP's coverage area. Such updates may also be predicated on a temporal restriction (e.g., time after leaving or entering an AP service area) as above.

As a non-limiting example, a person using a wireless device (e.g. STA 710) who boards a train (e.g. vehicle 745) may trade an association with a land-based AP e.g., SR AP 720 or LR AP 730) due to the superior link stability provided by OB AP 740 while aboard the moving train. The neighbor lists maintained by individual land-based AP may facilitate priority handovers by providing information regarding a neighboring OB AP 740 to the STA 710 as it approaches the service area of the train (and the onboard access point).

Alternatively, when the train approaches its destination, OB AP 740 may dynamically update its neighbor list, providing STA 710 with updated information regarding the neighboring land-based stations SR AP 720 or LR AP 730. As such, the handover from OB AP 740 to LR AP 730 (or SR AP 720 depending on the priority scan) may be conducted faster as the person disembarks the vehicle 745. STA 710 receives the information regarding neighboring APs (e.g., neighbor list information) removing the requirement of a blind full scan upon disembarking vehicle 745 or disassociation with OB AP 740.

Additionally, the qualities and capabilities of the various embodiments of STA 710 and APs 720, 730, 740 depicted with respect to FIG. 7 may also be implemented within STAs 120 and/or APs 110 of FIG. 1.

Figure 8:
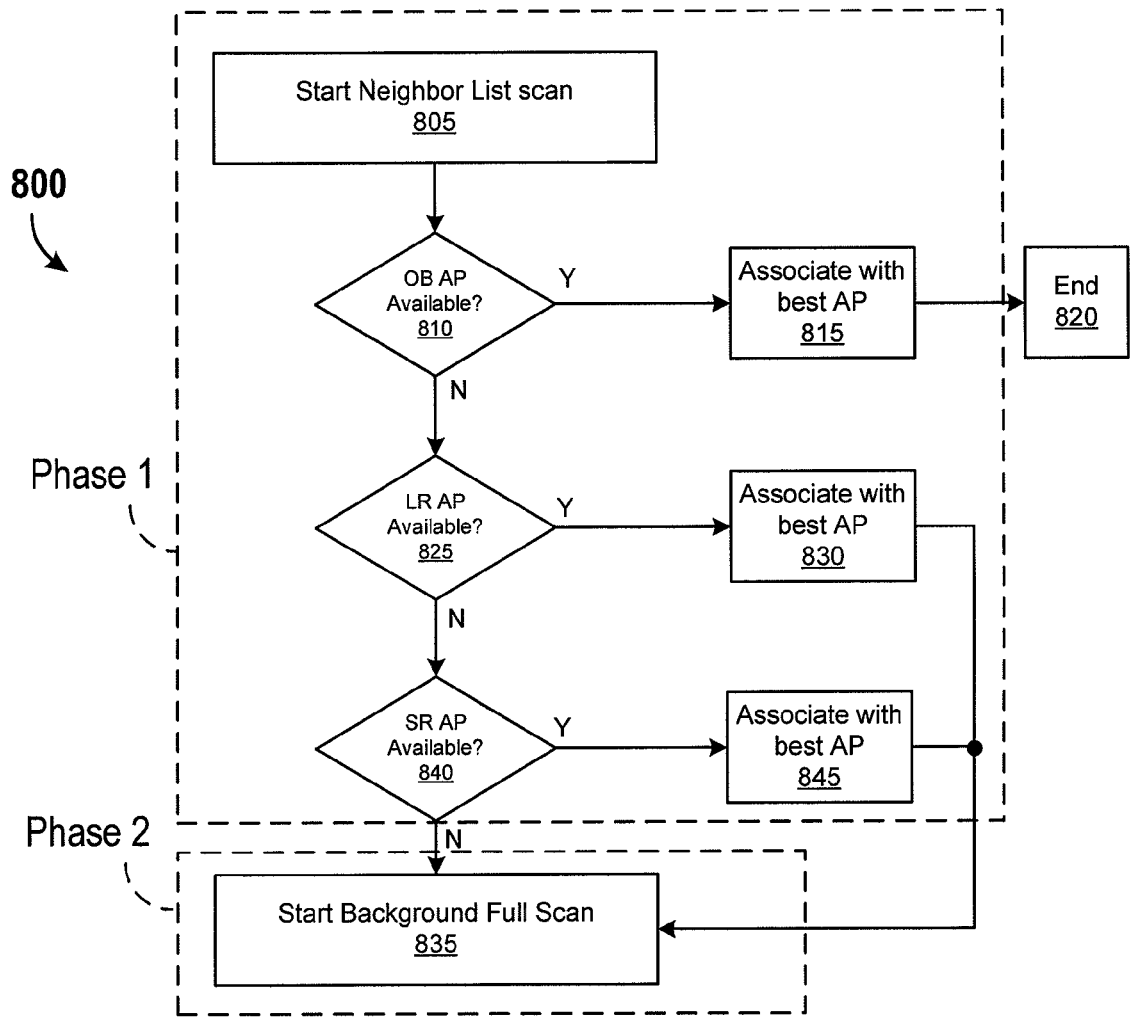
FIG. 8 illustrates a flowchart according to a method of the present disclosure.

Referring now to FIG. 8, a flowchart of an embodiment of the prioritized scan is shown and generally designated 800. In general, priority scan 800 may be defined with reference to two phases. Phase 1, shown in dashed lines, refers to the prioritized neighbor list (NL) scan. A fast moving STA 510, 610, 710 may scan the higher order APs in the NL and selectively associate with one of the APs, if available. The goal in such an embodiment is to quickly associate with the best available AP in the NL, in terms of link stability, such as an OB AP 740, in the case of a moving STA 710. Link stability, as discussed above, generally prefers an AP having a longer range or stronger signal from. Phase 2, also shown in dashed lines, incorporates a background full scan. In the event no OB AP is found after a phase 1 NL scan, a moving STA may continue to scan for APs with better link stability in the background (e.g., a background process). In an embodiment, this allows a STA to find an associate with a better AP (in terms of link stability) even though that AP it is not identified in a NL provided to the moving STA (e.g., STA 710).

Scan 800 begins with block 805 at which point an exemplary AP 710 begins phase 1 with the neighbor list scan. At decision block 820, the AP 710 may determine which APs are available, and if one is an OB AP 740. In the event there is more than one OB AP 740 available, the STA 710 will associate with the best AP (in terms of link stability) at block 815. The link stability may further be quantified as a weighted average, or "score," based on certain metrics such as signal strength, load, or available backhaul speed. The STA 710 may estimate over-the-air throughput based on signal strength and load, further enabling an estimation of link stability. This would ordinarily end the scan 800 at block 820, until the association with OB AP 740 is insufficient or the signal fades to an unusable level.

If no OB AP 740 is available at decision block 810, scan 800 proceeds to decision block 825 and determines whether, or the available APs, if there is an LR AP 730. If there is more than one, then the STA 710 may associate with the best LR AP 730 at block 830. However, because an OB AP 740 may provide more link stability than the LR AP 730, the STA 710 moves to phase 2 of the scan 800 and conducts a background full scan at block 835, in effort to locate (and associate with) an OB AP 740 that may be in the vicinity but not already in the NL.

At decision block 825, if there is no LR AP 730 available for association, the scan 800 proceeds to decision block 840 at which point STA 710 scans for an available SR AP 720. If there are more than one SR AP 720 available, the STA 710 may associated with the one having the highest link stability of those available at block 845. As before, because an OB AP 740 will likely provide higher link stability than SR AP 720, the background full scan is again executed in effort to scan for an OB AP 740 not already in the NL.

Figure 9:
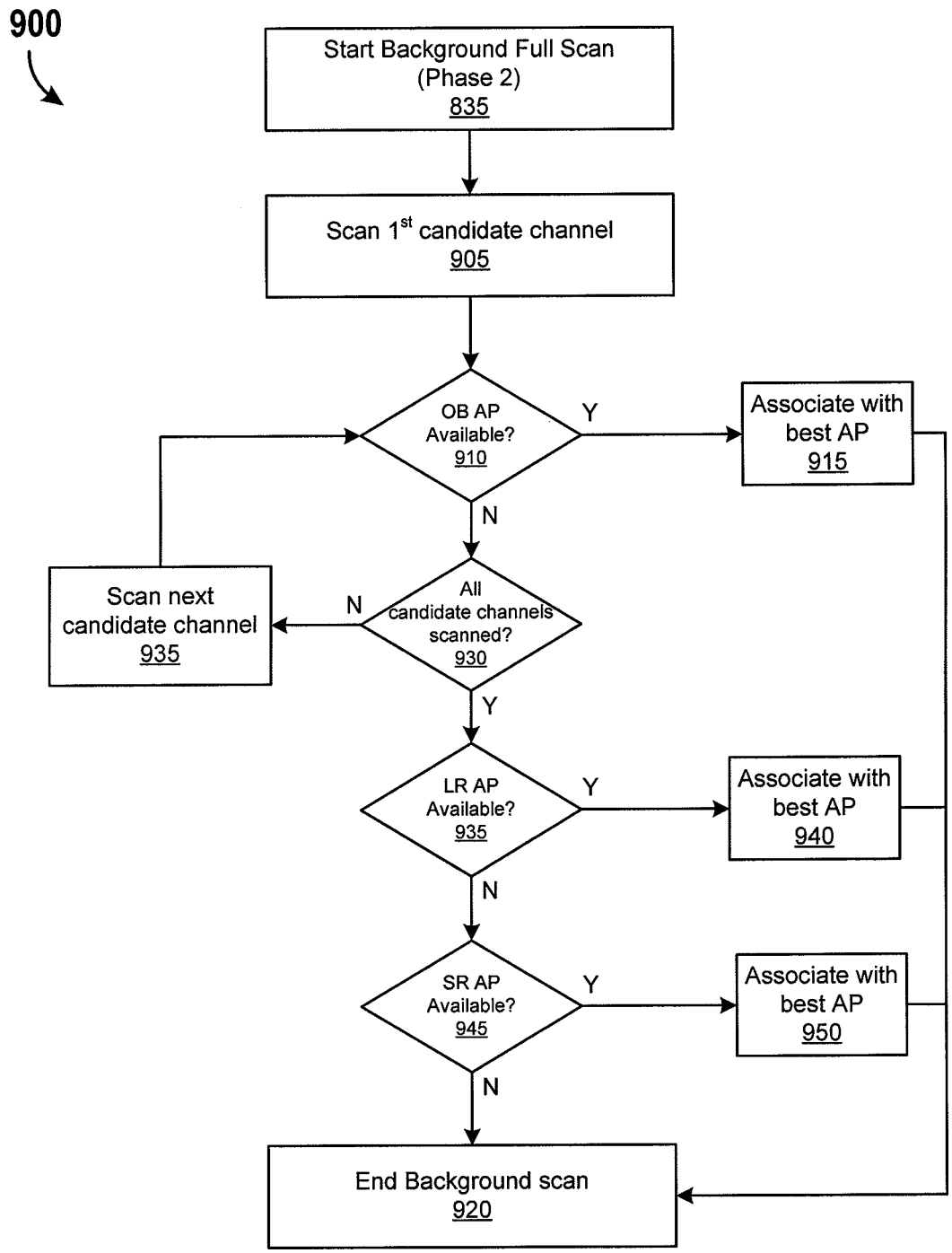
FIG. 9 illustrates a flowchart according to a method of the present disclosure.

Referring now to FIG. 9, an expanded illustration of phase 2 is shown and designated background full scan 900. When no OB AP 740 is found in the NL scan 800, scan 900 begins with block 835. At block 905, the next candidate channel is scanned for available APs. At decision block 910, the STA 710 may determine if an OB AP 740 is available. If so, scan 900 proceeds to block 915 and associates with the best available OB AP 740, (that is, the AP with the highest link stability) after which the back ground full scan 900 ends at block 920.

If, at decision block 910 there is no OB AP 740 available, STA 710 determines if all available channels have been scanned; if not, the scan 900 proceeds to block 925. If additional channels are available, scan 900 proceeds to block 935 and the next candidate channel is scanned for an available OB AP 740.

If at block 930 all candidate channels have been scanned, the scan 900 proceeds to decision block 935 where STA 710 determines if there are any LR AP 730 available. If so, STA 710 may associated with the LR AP 730 with the highest link stability at block 940, after which the background full scan may end at block 920.

Where there is no LR AP 730 available at decision block 735, the scan 900 proceeds to block 945 where the STA 710 may determine whether an SR AP 720 is available for association. If so, STA 710 may associate with the SR AP 720 with the highest link stability at block 950. If an SR AP 720 is available, then STA 710 may associate with it at block 950, again, ending the scan 900.

In an embodiment, the STA 710 may repeat background full scan 900 periodically until an OB AP 740 is found. Additionally, the frequency of background full scan 900 may be reduced in the event an OB AP 740 is not found after a certain amount of elapsed time. Such an option may serve to reduce power consumption.

In an embodiment, other optimizations to the background full scan may be implemented. For example, an OB AP 740 may send a beacon announcing service on dedicated channels, notifying STA 710 and allowing a scan of those channels as a further prioritized scan of candidate channels. Such an improvement may allow STA 710 to find potential OB APs earlier.

In an embodiment, a selective probe response from OB APs and LR APs may further be implemented. If a STA, such as STA 710, is associated with LR AP 730 following an NL scan, STA 710 may only search for an OB AP 740 in the later background full scan as it can be expected that OB AP 740 likely has high link stability. In such an embodiment, the STA 710 may target only an OB AP 740 as a potential responder to the probe request, further reducing the response load in a background scan 835. Similarly, if a STA 710 is associated with an SR AP 720 following an NL scan, the STA 710 may only select to search for an OB AP 740 or LR AP 730. As such, the STA 710 may further request that only LR AP 730 and OB AP 740 respond to a probe request during the background scan.

Figure 10A:
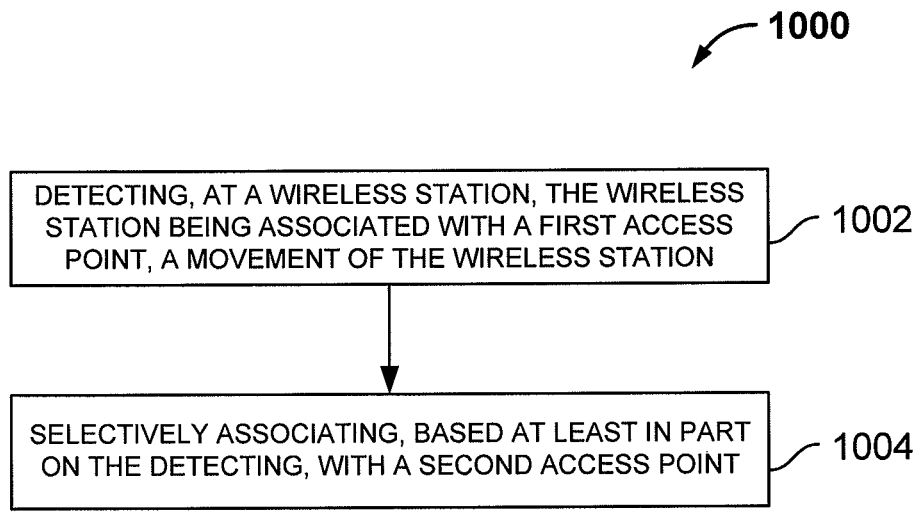
FIG. 10a illustrates a flowchart according to a method of the present disclosure.

Referring to FIG. 10*a*, a flowchart depicting a method of the present disclosure is shown and designated 1000. Method 1000 begins at block 1002 noting where a moving wireless station, such as those previously discussed, detects movement while associated with a first access point. The wireless station may to autonomously detect motion through the use one of the metrics discussed above such as, a moving station speed is higher than a speed threshold, a moving station handover rate is greater than a handover threshold, a beacon observation time, between a first time receiving a beacon to a last time receiving a beacon, is less than a threshold for a detected access point, a measurement of the Doppler shift of the detected access point signal, or a measured access point signal temporal correlation is less than a threshold time spacing. A moving station may also be informed by a network, network controller, or other AP of its motion.

Upon detecting the motion at block 1002, the wireless station may utilize various characteristics of APs in the vicinity to selectively associate with an AP. As discussed above, the selective association may be based on a priority scan of available APs, selecting an OB AP, LR AP, or SR AP based on various desired characteristics, link stability, and station speed. A STA may prefer an OB AP more than a LR AP and a LR AP more than a SR AP due to link stability, in accordance with the processes discussed in FIG. 8 and FIG. 9.

Figure 10B:
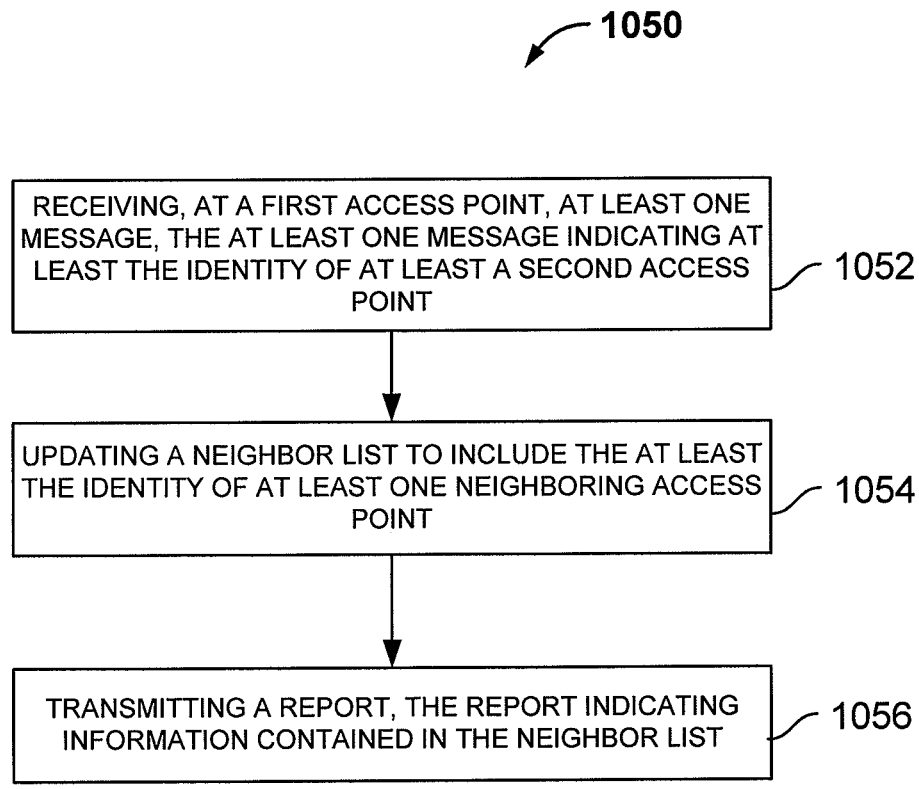
FIG. 10b illustrates a flowchart according to a method of the present disclosure.

Referring to FIG. 10*b*, a flowchart depicting a method of the present disclosure is shown and designated 1050. Method 1050 begins at block 1052, when a first AP may receive a message identifying a second AP in the vicinity. The message may further indicate the second APs capabilities, such as range and/or coverage information among other characteristics. The first AP may use this information and update its neighbor list at block 1054, maintaining a record of the identity and capabilities of the available APs in the vicinity. The first AP may do this repeatedly for each additional AP encountered or may further remove information as the respective APs are no longer available. At block 1056, the first AP may transmit the contents of the neighbor list to a neighboring STA, which may further utilize the information in the processes disclosed herein.

Figure 11:
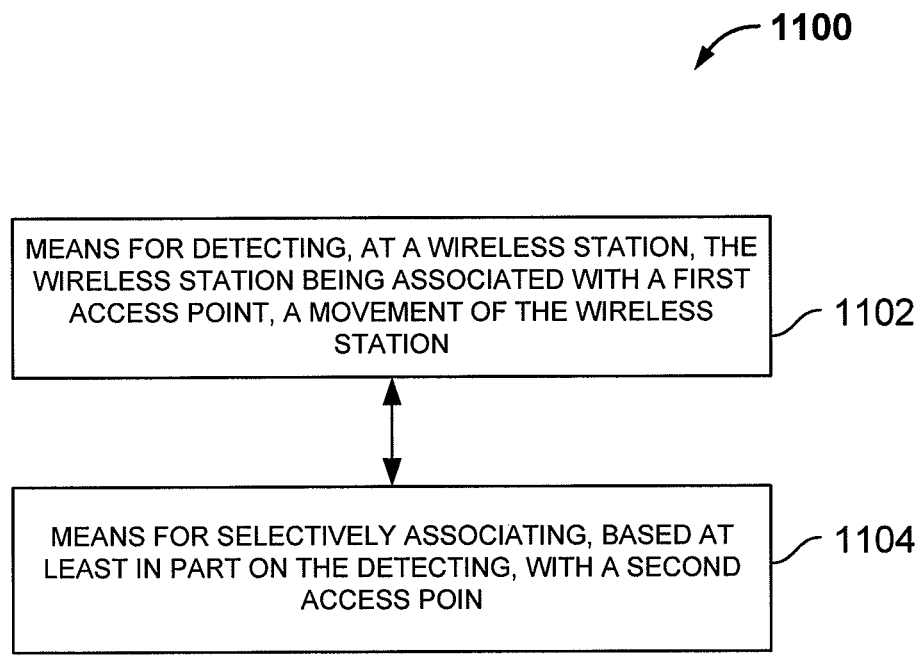
FIG. 11 illustrates a functional block diagram according to an apparatus of the present disclosure.

Referring to FIG. 11, a functional block diagram of an apparatus for wireless communication is shown and generally designated 1100. Apparatus 1100 comprises a means 1102 for detecting at a wireless station, the wireless station being associated with a first access point, a movement of the wireless station. The apparatus 1100 further comprises means 1104 for selectively associating with a second access point based at least in part on the detected movement. The selective association may further comprise initiating a scan for other access points based at least in part on the detected movement, and or identifying, based on the scan, other available access points. The means 1104 for selectively associating may further comprise other characteristics as disclosed herein. Means 1102 and means 1104 interact such that apparatus 1100 may selectively associated with a desired AP based on a priority scan utilizing information about other available APs. As noted herein such information may be provided by nearby APs via direct signaling to the STA, through a neighbor list or via autonomous detection by the STA.

Figure 12:
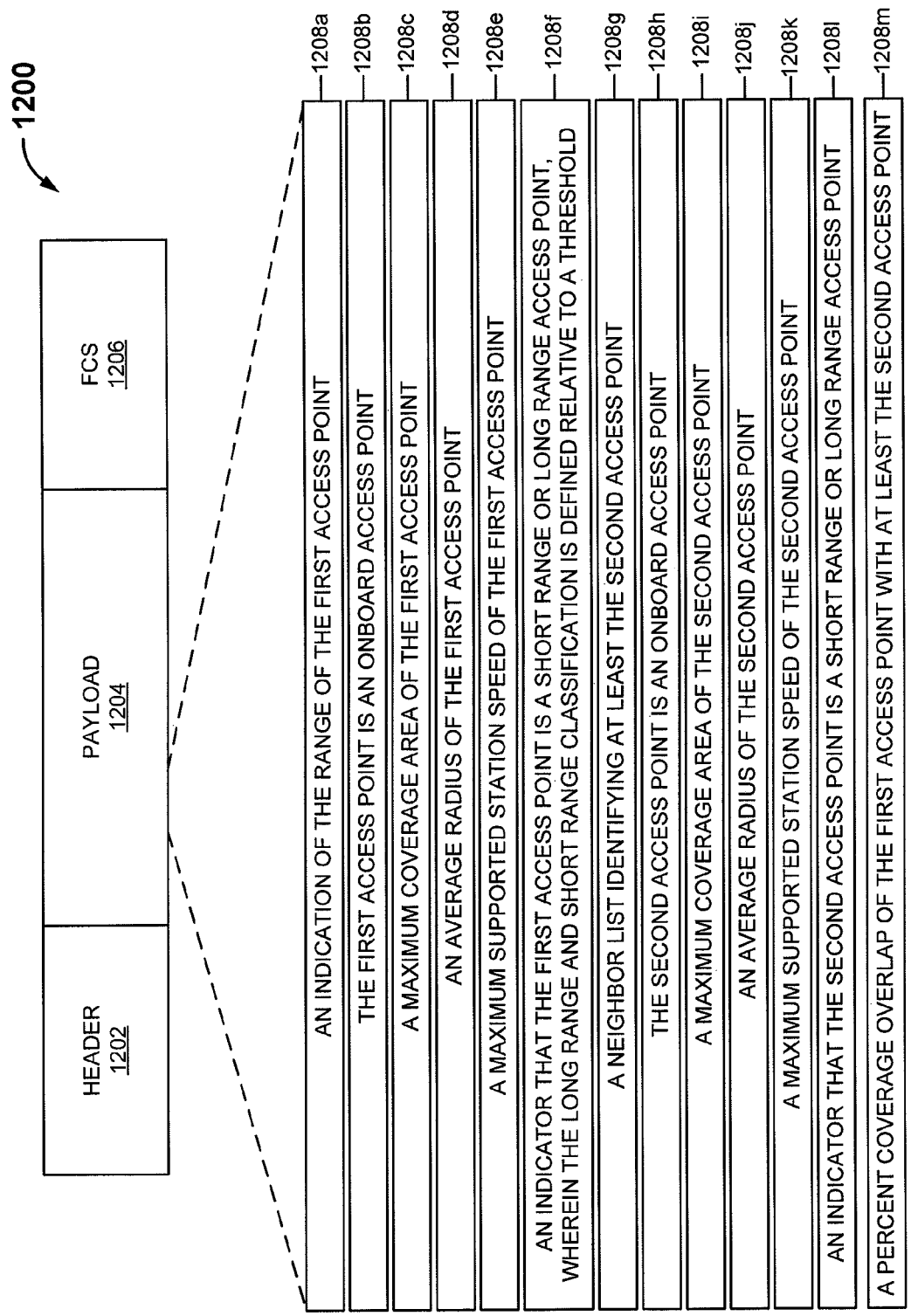
FIG. 12 illustrates a block diagram of an exemplary data frame according to the present disclosure.

Referring now to FIG. 12, an embodiment of a data frame used in the implementation of the methods of the present disclosure is shown, and generally designated 1200. Frame 1200 may comprise a header 1202 having addressing information such as a sender and receiver addressing, medium access control (MAC) information and additional information indicating the source and destination of the frame. The frame 1200 may further include frame check sequence (FCS), FCS 1206, including check sum and error correction information. Payload 1204 may comprise information required for the selective association methods disclosed herein. As noted above, a moving STA may initiate a prioritized scan or a (blind) full scan for better wireless service upon receipt of information indicating the presence of other APs. Such information may arrive via a message from a first AP to which the STA is currently associated or directly from a neighboring, second AP to which the STA is not currently associated. Such information may arrive in the form a beacon on a dedicated beaconing channel from the second AP or a report from a currently associated first AP indicating the details regarding services available from other devices (e.g., other AP's) in the neighbor list. At least a portion of payload 1204 may include information 1208. Information 1208 may be subdivided as information 1208*a*-1208*m*, such as an indication of the range of the first access point 1208*a*, an indication that the first access point is an onboard access point 1208*b*, a maximum coverage area of the first access point 1208*c*, an average radius of the first access point 1208*d*, a maximum supported station speed of the first access point 1208*e*, or an indicator that the first access point is a short range or long range access point 1208*f*, wherein the long range and short range classification is defined relative to a threshold. The payload may further comprise information 1208 regarding a neighbor list of the first AP identifying at least the second access point 1208*g*, but may also include information regarding a plurality of other neighboring APs. The payload my include information 1208 regarding the second access point, such as an indication that the second access point is an onboard access point 1208*h*, a maximum coverage area of the second access point 1208*i*, an average radius of the second access point 1208*j*, a maximum supported station speed of the second access point 1208*k*, an indicator that the second access point is a short range or long range access point 1208l, and/or a percent coverage overlap of the first access point with at least the second access point 1208*m*. The payload 1204 may include as many or few of these characteristics as practical for the report. The specific characteristics 1208a-m of information 1208, as well as other aspects of payload 1204) may be indicated through the use of specific frames or packet data (e.g., a bit indicating the AP is an OB AP).

Figure 13:
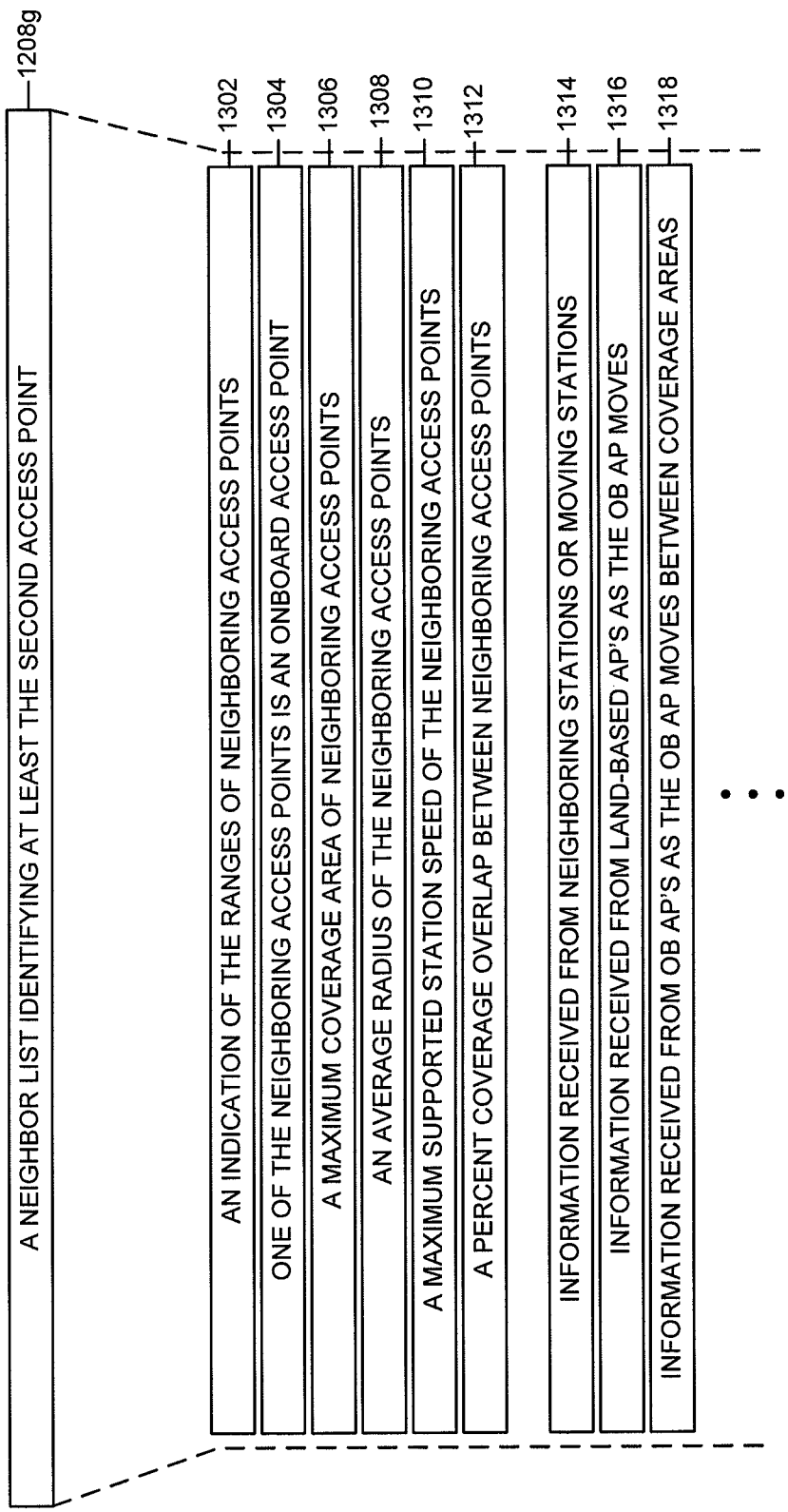
FIG. 13 illustrates a block diagram of an exemplary data frame according to the present disclosure.

Referring to FIG. 13, a function block diagram of the neighbor list 1208g from FIG. 12 is shown depicting a number of the possible data frames or units that might be contained in a report of the neighbor list 1208g, a beacon channel from an AP (e.g., OB AP, LR AP, SR AP, as described herein), message from a network server identifying the information, etc.

Neighbor list 1208g may include an indication of the ranges of the neighboring access points 1302 (e.g., OB AP, LR AP, SR AP), an indication that one of the neighboring access points is an OB AP 1304 (e.g., OB AP 740), an indication of the maximum coverage area of one or more neighboring access points 1306, an average radius of one or more neighboring access points 1308, a maximum station speed supportable by one or more neighboring access points 1310, and/or a percent coverage overlap between one or more neighboring access points 1312.

The neighbor list 1208g may further include second or third tier information, that is, information included in beacons or reports of a neighbor list 1208g transmitted from another neighboring AP or STA. Such information may include information received from neighboring stations or moving stations 1314 (regarding other APs), information received from land-based APs (e.g., LR AP, SR AP), as an OB AP (e.g., OB AP 740) moves 1316 through the coverage area, and/or information received from OB AP's as the OB AP moves between coverage areas 1318 of land-based (e.g., stationary) APs.

Each of the data or information elements disclosed may be provided to other STAs or APs in effort to allow a moving STA to achieve the highest stability or most stable link with an AP, according to the priorities (association priority) discussed herein. It should be appreciated by those skilled in the art that this is not intended to be an exhaustive list of information that may be included in a neighbor list 1208g.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication, comprising:
   detecting whether a movement characteristic of a wireless station satisfies a threshold, by the wireless station, the wireless station associated with a first access point and communicating with the first access point via a contention-based communication protocol;
   initiating a selective scan for a second access point, by the wireless station, based at least in part on determining that the detected movement characteristic satisfies the threshold;
   identifying the second access point, by the wireless station, based on the selective scan; and
   associating with the second access point, by the wireless station, based at least in part on the selective scan and an association priority, the association priority prioritizing an onboard access point over a stationary access point and further prioritizing a longer range access point over a shorter range access point.

2. The method of claim 1, wherein the association priority is further based at least in part on a link stability.

3. The method of claim 2, further comprising periodically conducting a background scan for the onboard access point having a higher link stability than the second access point, by the wireless station, while associated with the second access point.

4. The method of claim 1, wherein the selective scan is initiated based on receiving a report from the first access point, the report indicating at least one of:
   an indication of an effective range of the first access point;
   an indication whether the first access point is an onboard access point;
   a maximum coverage area of the first access point;
   an average radius of the first access point;
   a maximum supported station speed of the first access point;
   an indication that the first access point is a short range or long range access point, wherein a long range and short range classification is defined relative to a predetermined threshold;
   a neighbor list identifying at least the second access point;
   an indication that the second access point is an onboard access point;
   a maximum coverage area of the second access point;
   an average radius of the second access point;
   a maximum supported station speed of the second access point;
   an indication that the second access point is a short range or long range access point; and
   a percent coverage overlap of the first access point with at least the second access point.

5. The method of claim 4, wherein the report is received via a broadcast message from one or both of the first access point or the second access point.

6. The method of claim 1, wherein the initiating the selective scan is additionally based on determining, by the wireless station, at least one of:
   a speed of the wireless station;
   a received signal strength from the first access point; and
   receipt of a beacon from the second access point, the beacon identifying the second access point as an onboard access point.

7. The method of claim 1, wherein detecting whether the movement characteristic of the wireless station satisfies the threshold is based on determining at least one the of the following:
   whether a speed of the wireless station is higher than a speed threshold;
   whether a moving station handover rate is greater than a handover threshold;
   whether a beacon observation time, between a first time receiving a beacon to a last time receiving a beacon, is less than a threshold for a detected access point;
   whether a measurement of a Doppler shift of a detected signal from the first access point is greater than a Doppler shift threshold; and
   whether a measured access point signal temporal correlation is less than a threshold time spacing.

8. The method of claim 1, further comprising:
   associating with the second access point, prior to initiating the selective scan, if a percent coverage by the second access point of a coverage area of the first access point exceeds a coverage percent threshold.

9. A method of wireless communication, comprising:
   determining, by a first access point, that a second access point has entered a coverage area of the first access point,
   receiving, at the first access point, at least one message from the second access point, the at least one message comprising:
   an indication of an identity of the second access point, and
   an indication of whether the second access point is an onboard access point;

modifying. by the first access point, a neighbor list to include at least the identity of the second access point and whether the second access point is an onboard access point; and transmitting, by first access point, a report to a wireless station, the report indicating information contained in the neighbor list.

10. The method of claim 9, further comprising:

determining that a third access point has left the coverage area of the first access point; and modifying, based on determining that the third access ,point has left the coverage area, the neighbor list to remove information regarding the third access point.

11. The method of claim 9, wherein the second access point comprises an onboard access point and wherein the at least one message further indicates a type of vehicle on which the second access point is present.

12. The method of claim 9, further comprising:

receiving, by the first access point, from a plurality of wireless stations within a coverage area of the first access point, a plurality of indications of received signal strength of the second access point at a plurality of locations; and determining, by the first access point, a percent of overlapped coverage with the second access point based at least in part on the plurality of indications of received signal strength.

13. A wireless station for wireless communication, comprising:

a processor configured to:

detect whether a movement characteristic of the wireless station satisfies a threshold, the wireless station associated with a first access point and communicating with the first access point via a contention-based communication protocol;

initiate a selective scan for a second access point, based at least in part on determining that the detected movement characteristic satisfies the threshold;

identify the second access point, based on the selective scan; and generate an association message for association with the second access point, based at least in part on the selective scan and an association priority, the association priority prioritizing an onboard access point over a stationary access point and further prioritizing a longer range access point over a shorter range access point; and a transceiver configured to transmit the association message to the second access point.

14. The wireless station of claim 13, wherein the association priority is further based at least in part on a link stability.

15. The wireless station of claim 14, wherein the processor is further configured to periodically conduct a background scan for the onboard access point having a higher link stability than the first access point or the second access point, while the wireless station is associated with the second access point.

16. The wireless station of claim 13, wherein the transceiver is further configured to receive a report from the first access point, and wherein the processor is further configured to initiate the selective scan based on the report, the report indicating at least one metric selected from the group comprising:

an indication of the range of the first access point;
an indication whether the first access point is an onboard access point;
a maximum coverage area of the first access point;
an average radius of the first access point;
a maximum supported station speed of the first access point;
an indication that the first access point is a short range or long range access point, wherein a long range and short range classification is defined relative to a predetermined threshold;
a neighbor list identifying at least the second access point;
an indication, that the second access point is an onboard access point;
a maximum coverage area of the second access point;
an average radius of the second access point;
a maximum supported station speed of the second access point;
an indication that the second access point is a short range or long range access point; and
a percent coverage overlap of the first access point with at least the second access point.

17. The wireless station of claim 16, wherein the report is received via a broadcast message from one or both of the first access point or the second access point.

18. The wireless station of claim 13, wherein the processor further configured to initiate the selective scan based on a determining at least one of:

a station speed;
a received signal strength from the first access point; and
receipt of a beacon from the second access point, the beacon identifying the second access point as an onboard access point.

19. The wireless station of claim 13, wherein the processor is further configured to detect whether the movement characteristic of the wireless station satisfies the threshold based on determining at least one the of the following:

whether a speed of the moving station is higher than a speed threshold;
whether a moving station handover rate is greater than a handover threshold;
whether a beacon observation time, between a first time receiving a beacon to a last time receiving a beacon, is less than a threshold for a detected access point;
whether a measurement of a Doppler shift of a detected signal from the first access point is greater than a Doppler shift threshold; and
whether a measured access point signal temporal correlation is less than a threshold time spacing.

20. The wireless station of claim 13, wherein the processor is further configured to initiate an association procedure with the second access point, prior to initiating the selective scan, if a percent coverage by the second access point of a coverage area of the first access point exceeds a coverage percent threshold.

21. An first access point for wireless communication, comprising:

a processor configured to determine that a second access point has entered a coverage area of the first access point;

a receiver configured to receive at least one message from the second access point, the at least one message comprising:

an indication of an identity of the second access point, and an indication of whether the second access point is an onboard access point, wherein the processor is further configured to modify a neighbor list to include at least the identity of the second access point and whether the second access point is an onboard access point; and a transmitter configured to transmit a report to a wireless station, the report indicating information contained in the neighbor list.

22. The first access point of claim 21, wherein the processor is further configured to:
  determine that a third access point has left the coverage area of the first access point; and
  modify, based on determining that the third access point has left the coverage area, the neighbor list to remove information regarding the third access point.

23. The first access point of claim 21, wherein the second access point comprises an onboard access point and wherein the at least one message further indicates a type of vehicle on which the second access point is present.

24. The first access point of claim 21, wherein:
  the receiver is further configured to receive, from a plurality of wireless stations within a coverage area of the first access point, a plurality of indications of received signal strength of the second access point at a plurality of locations, and
  the processor is further configured to determine a percent of overlapped coverage with the second access point based at least in part on the plurality of indications of received signal strength.

\* \* \* \* \*